April 14, 1953      I. J. WILSON      2,634,636
RIM STRETCHING CONE FOR EYE GLASS RIMS
Filed Oct. 11, 1949
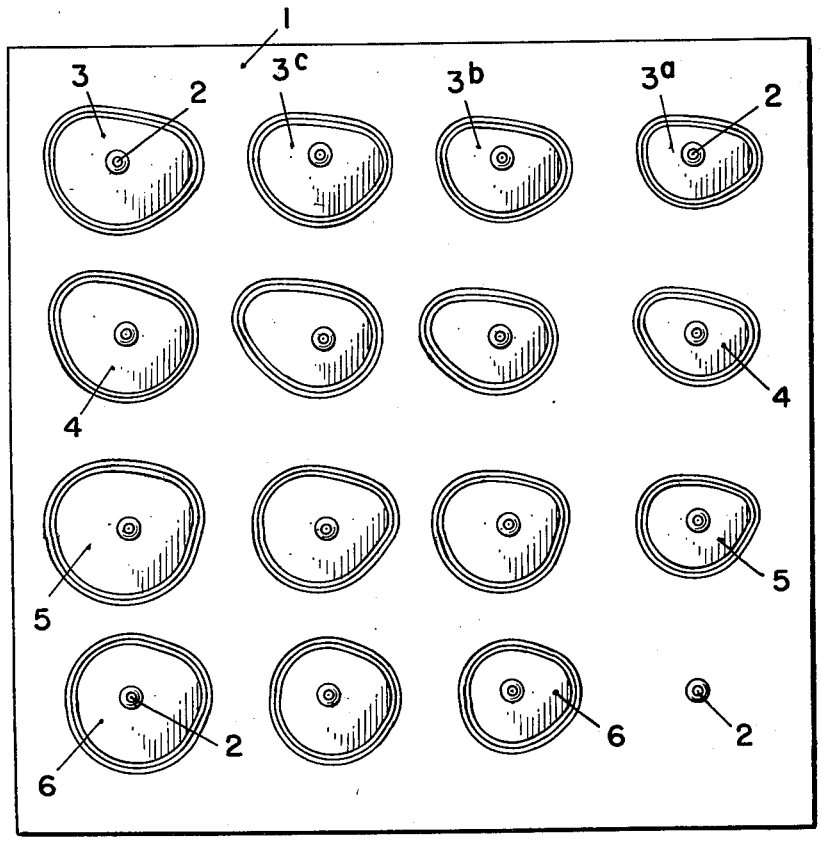
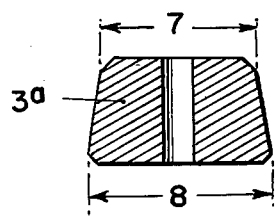
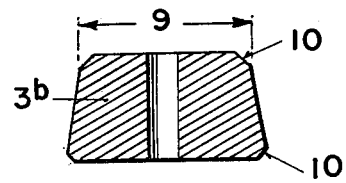
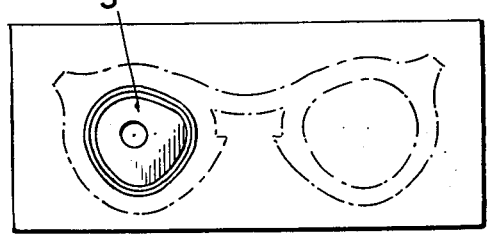
Inventor
ISIDORE J. WILSON,
By Wendroth, Lind & Ponack
Attorneys Patented Apr. 14, 1953

2,634,636

UNITED STATES PATENT OFFICE 2,634,636

RIM STRETCHING CONE FOR EYEGLASS RIMS

Isidore J. Wilson, Trenton, N. J., assignor to Optical Accessories Corp., a corporation of New Jersey Application October 11, 1949, Serial No. 120,787

2 Claims. (Cl. 81—3.5)

This invention relates to improvements in rim stretching cones for eye glass rims and has particular reference to an improved device and method for stretching non-metallic rims subject to softening by heat such as for example zylonite.

Heretofore rim stretching devices for eye glass rims subject to softening by the application of heat have involved the use of a heated elongated cone over which the rim of the eye glass frame was adapted to be forced to effect a stretching of the rim to the desired size concurrently with the transmission of heat to the rim.

In another form of a rim stretcher heretofore utilized, an elongated wooden cone was used after application of heat either by immersion of the frames in hot salt or sand. This type of stretcher, however, was usually too long to submerge into hot salt or sand baths with a consequent inconvenience to the operator.

In either of the above procedures, the stretching of the rim was not satisfactory. If extreme care was not used, the rim became stretched either too much below or above the end piece of the eye glass frame and in addition extreme care was necessary as to the amount of heat imparted to the rim since this heat would have a tendency to flatten the curve of the shell rim where the bevelled lens must fit.

An object of the present invention is to provide a new and improved rim stretching device for eye glass frames overcoming the aforementioned unsatisfactory devices but being extremely simple in construction, inexpensive to manufacture, easy to use and extremely accurate.

Other and further objects of the present invention will be apparent from the detailed description of a single preferred embodiment of the invention taken together with the drawings in which—

Figure 1 is a plan view of a board having a plurality of rim stretching devices mounted thereon;

Figure 2 is a sectional view through a single rim stretching device;

Figure 3 is a view similar to Figure 2 but showing the next larger stretching device, and Figure 4 is a top plan view disclosing the method of utilizing the device of the present invention.

The rim stretching devices of the present invention are in the form of a plurality of individual stretchers which are made to the exact shape of different styles of eye glass rims. For convenience in holding different sets adapted for use with different styles of rims, a support or board 1 is provided having a plurality of pegs 2 arranged in rows thereon. In Figure 1, there are shown four sets or series of individual rim stretching cones 3, 4, 5 and 6 mounted on these pegs through central openings therein. These individual cones can be carefully shaped to fit rims of different shapes, such as for example, Spark, Hussy, Chanti, Peri and any other desired shape.

For each style and shape of rim stretching cone according to the present invention, it is necessary to have different sized cones to permit a continued stretching of the rim over a wide range. The individual cones as disclosed in the drawings are approximately three-quarters of an inch in thickness and each cone is tapered to the extent of two or three millimeters from top to bottom as shown in Figures 2 and 3. In a series of cones such as 3, the smaller cone 3a has the smaller dimension 7 approximately 38 millimeters whereas the larger dimension 8 will be approximately 40 millimeters. This is shown for example in Figure 2. In Figure 3, the next larger cone in the series shown and having the smaller dimension 9 slightly less than 40 millimeters which is the larger dimension of the next preceding smaller cone. In the same manner, the larger dimension of the cone 3b would be approximately 42 millimeters and the smaller dimension of the next succeeding cone 3c would be slightly less than 42 millimeters. This variation in size is essential so that a rim having a given dimension, for example 38 millimeters, can be placed on the cone over the smaller dimension thereof which will actually be slightly less than 38 millimeters for purposes hereinafter to be set forth.

Each set of cones can vary in number depending upon the shell rim size desired. Under normal circumstances, the set would consist of approximately four or five cones for each different shape for the reason that eye glass rims with which the present invention is concerned usually vary from 32 to 48 millimeters.

In addition to the differences in dimensions as set forth for each cone, the edges of the cones are bevelled or tapered at 10 and these bevelled edges are beyond the dimensions as set forth for the cones. These bevelled edges serve the purpose of facilitating the placing of the rims on the cones and at the same time ensuring the fact that the cones will not be distorted when placing the rims on the cones and removing them therefrom.

In utilizing the cones for stretching a rim to the desired size, the following procedure will take place. As set forth before the eye glass frames are of a type which become soft when immersed in hot salt or sand baths or other types of dry heaters. A series of cones of the desired shape corresponding to that of the eye glass rim is selected and the individual cone in that series having a smaller dimension of the rim is taken. That end of the selected cone having the smaller dimension is inserted in the rim in proper position corresponding to the shape of the rim in such a manner that the rim will just fit on this part of the cone. The rim and the cone inserted therein are then immersed into the hot salt or sand bath or the like and allowed to remain in the bath long enough for the rim to become softened to a proper amount. The rim and cone are then removed from the bath and the rim is drawn evenly over the cone to the larger dimension thereof by the use, for example, of the fingers of both hands. When removed from the cone, the rim will then have attained the larger dimension of the cone and in the example described with respect to Figure 2 will have been stretched approximately two millimeters. If it is desired to further stretch the rim, it will then be necessary to utilize the next larger cone in the series since the so-stretched rim will then fit onto the smaller dimension of the second cone due to the slight variation in the smaller dimension of the second cone. The same procedure for stretching of the rim will then follow on the second cone. If it is desired, for example, to stretch a 40 millimeter rim to 46 millimeters, it will then be necessary to utilize three cones in the series, the first cone would stretch the rim from 40 to 42 millimeters; the second cone from 42 to 44 millimeters; and the third cone from 44 to 46 millimeters.

It will be readily apparent from the foregoing description of a single preferred embodiment of the invention, when taken with the description of the method of utilizing the individual rim stretching cones that the main draw-backs of prior art devices have been overcome and a very simple yet extremely accurate stretching of the glass rims can be accomplished. It will also be apparent that various changes may be made in the devices of the present invention, such for example, as mounting a single series of the cones on an individual board and thereby having a plurality of boards having different series of cones thereon. For simplification in use of the cones of the present invention, it is desirable to have the type of rim marked on the cones as also the smaller dimension of the cone so that an easy selection of the proper cone and proper series can be made.

Other modifications will be apparent to those skilled in the art and within the scope of the present invention as defined in the appended claims without departing from the spirit of the present invention.

I claim:

1. Eye glass rim stretcher apparatus for series rim stretching comprising a plurality of progressively increasing differently sized rim stretching cones, said cones being shaped to correspond with the shape of an eye glass rim to be stretched thereon, each said cone varying in dimension uniformly from one end to the other, each succeeding cone in the series having a smaller dimension slightly less than the larger dimension of the preceding cone whereby an eye glass rim can be progressively stretched by stretching over the cones progressively by sequential manipulation.

2. Eye glass rim stretcher apparatus as claimed in claim 1, said cones having a shallow depth and each said cone having chamfered edges at both ends thereof, the smaller and larger dimensions on the cone being placed inwardly of said chamfered edges with respect to the body of said cone.

ISIDORE J. WILSON.

References Cited in the file of this patent

UNITED STATES PATENTS

| Number | Name | Date |
|---|---|---|
| 1,254,274 | Pryor | Jan. 22, 1918 |
| 1,264,519 | Hinson | Apr. 30, 1918 |
| 1,365,203 | Starrett | Jan. 11, 1921 |
| 1,685,167 | Ljunglof | Sept. 25, 1928 |
| 1,712,473 | McWethy | May 7, 1929 |
| 2,180,572 | White | Nov. 21, 1939 |